Patented June 12, 1951

2,556,729

UNITED STATES PATENT OFFICE 2,556,729

METAL-FREE PHTHALOCYANINE OF NOVEL COLOR CHARACTERISTICS

Otto Stallmann, Bridgeton, N. J., assignor to E. I. du Pont de Nemours & Company, Wilmington, Del., a corporation of Delaware No Drawing. Application March 5, 1949, Serial No. 79,915

1 Claim. (Cl. 260—314.5)

This invention relates to a novel phthalocyanine coloring matter and to a process of producing the same. More particularly this invention relates to a novel physical form of metal-free phthalocyanine in a finely divided, solid state, characterized by a greenish-blue shade, by high tinctorial strength and by tinctorial stability when incorporated into vehicles containing aromatic liquids.

It is an object of this invention to produce a phthalocyanine pigment of a greenish-blue shade, of high tinctorial strength and of other good qualities which will make it useful for incorporation into liquid coating compositions, such as paints, lacquers and printing inks. Other and further objects of this invention will appear as the description proceeds.

Metal-free phthalocyanine as produced by present-day methods is a blue pigment of good tinctorial qualities, but does not differ much in shade from copper-phthalocyanine. The metal-free compound is greenish compared to copper-phthalocyanine, but the margin of difference is so narrow that the shade can be approximated without special difficulty by admixing to the copper compound a small quantity of highly chlorinated copper-phthalocyanine (above 14 Cl per molecule). As a result, the metal-free compound has heretofore been manufactured in relatively small quantities compared to copper-phthalocyanine.

On the other hand there has been felt for a long time a commercial want for a color of the good fastness and high tinctorial qualities of the phthalocyanine series of pigments but of a shade intermediate that of the substantially pure blue copper compound on the one hand and the green polychloro compound (above 14 Cl) on the other hand. Such an intermediate greenish-blue is badly needed for instance in the art of 3-color printing.

The 3-color printing art, as is well known, works on the principle that practically any shade of color can be reproduced by mixing various proportions of 3 primary colors, namely red, yellow and blue. The standard for the requisite blue has hitherto been Peacock Blue Lake which is a basic color (Color Index No. 671) in the form of barium salt deposited on an aluminum hydroxide substratum. This pigment is fine as to color, but it suffers from many defects, principal of which is fugitiveness to light. Also, the lake is relatively weak tinctorially, requiring large proportions thereof to produce a given intensity of the bluish shade. Furtermore, being insoluble in lake form only, the use of this color requires weighting the pigment with large proportions of the tinctorially useless substratum.

Copper-phthalocyanine itself cannot be substituted for Peacock Blue Lake, because its color is a reddish blue by comparison; also, its absorption band is irregular and covers too wide a range of wave lengths, making the color undesirable for 3-color printing purposes. Metal-free phthalocyanine as it is known today (synthesized by any of the methods of the art and purified by "acid-pasting") is likewise too reddish blue compared to Peacock Blue; furthermore, it is relatively dull in shade. Finally, both copper-phthalocyanine and metal-free phthalocyanine suffer badly from crystal growth and flocculation when in contact with aromatic solvents. Both of these tendencies express themselves through fading of the color when a paint or printing ink composition containing said pigments in contact with an aromatic liquid vehicle is allowed to stand, as in storage or shipment. On the other hand modern high-speed printing machines do demand special types of liquid vehicle, which generally are characterized by containing as part thereof xylene or other liquids which promote crystal growth in the mentioned colors.

Another pronounced commercial want exists in the paint industry. The paint maker has available on the one hand copper-phthalocyanine, which is a pure blue (or "reddish" blue when compared to Peacock Blue). On the other hand he has the polychloro copper-phthalocyanine ($CuPc.Cl_x$, $x=14$ to $15$), which is green. If he wants an intermediate color he has to step out of the phthalocyanine field, and lose their advantages of exceptional light fastness, alkali fastness, tinctorial strength, etc. Mixing copper-phthalocyanine with its poly-chlorinated derivative, is not satisfactory when the percentage of each is substantial, because of the resulting dullness imparted to the product. And the present brand of metal-free phthalocyanine, as already noted, does not contribute much toward the solution of problems of this nature, because its shade is too close to that of copper-phthalocyanine.

I have now found that all the aforegoing problems can be solved, and the commercial wants readily satisfied by a new physical form of metal-free phthalocyanine, which I shall hereinafter designate as the pigmentary beta form. This form not only has a most desirable greenish shade of blue, intermediate that of copper-phthalocyanine on the one hand and polychloro copper-phthalocyanine on the other hand, but it has also the advantages of high tinctorial strength and of being essentially free of crystal growth and flocculation troubles when in contact with crystal-growth promoting solvents. For a fuller understanding of the physical nature of the new compound and of the method of producing it, I must now digress and discuss the crystalline structure of certain phthalocyanine compounds.

Copper-phthalocyanine and metal-free phthalocyanine have been known to exist in two crystalline forms, which have been designated in the art as the alpha and beta modifications. Summarized descriptions of the two crystal modifications may be found in FIAT Final Report No. 1313, vol. III, PB No. 85,172. These two modifications are most clearly characterized by their X-ray diffraction patterns, which are so different that they enable both qualitative distinction and quantitative estimation of the relative amounts of the two types in mixtures.

The alpha form is the one obtained by "acid-pasting" the color (i. e. reprecipitation from $H_2SO_4$ solution), and hitherto this has been the only form that could be reduced sufficiently in particle size to be suitable for use as pigment in paints or printing inks. The beta form, on the other hand, occurs generally in the crude mass as obtained directly in some of the syntheses of this color, but its particle size and purity are not sufficiently fine to make this form suitable for use as pigment. Salt milling the beta form according to U. S. P. 2,402,167, to reduce its particle size, followed by the usual extraction of the salt with dilute acid, invariably produces the alpha form. On the other hand, any attempt to convert the finely divided, acid-pasted, alpha form into beta, as by heating over 300° C. or by suspension in xylene or other liquid, produces the beta form in large crystals which have no tinctorial value.

I now find, that metal-free phthalocyanine can be produced in a new physical form which combines the beta X-ray pattern with a fine particle size, suitable for use as pigment, if one subjects ordinary metal-free phthalocyanine, that is either the crude beta form or the acid-pasted alpha form, to salt-grinding in the presence of a small quantity of an organic liquid, as more fully defined hereinbelow, the quantity of liquid being insufficient to convert the salt-pigment mixture into a doughy mass. Essentially, this procedure follows the general process outlined by Donald P. Graham in copending application Serial No. 79,894, of even date herewith.

Moreover, the resulting finely divided beta form is much greener than the hitherto known or "ordinary" metal-free phthalocyanine, the shift toward the green being sufficiently great to fill the hereinbefore mentioned gaps in the commercial array of pigments for 3-color printing and for the paint industry.

In addition, the novel, pigmentary beta form possesses a very high tinctorial strength, and possesses unexpected resistance toward crystal growth and flocculation when in contact with aromatic or other troublesome liquids. Thus, when boiled for 1 hour in xylene, no perceptible loss of tinctorial strength is observed in the new product. Nor has any fading been observed in a paint prepared from the new color which employed a standard vehicle (33% of toluene by weight), upon letting the paint stand for 21 days at 50° C. (the standard test).

The said crystalline stability is especially surprising when it is recalled that in the alpha form, metal-free phthalocyanine is much more badly susceptible to can-fading by crystal growth and flocculation than copper-phthalocyanine, and is in fact the worst offender in this respect in the entire gamut of phthalocyanine colors.

The said novel, pigmentary, beta form of metal-free phthalocyanine may also be produced by other methods. For instance, the crude beta form may be subjected to grinding in a ball mill while suspended in a relatively large quantity of acetone, or other convenient liquid, in the absence of salt, this method following essentially the general process outlined by Frank W. Lane in copending application Serial No. 79,902, of even date herewith.

Without limiting my invention, the following examples are given to illustrate the preparation of the novel color.

*Example 1 (Following the procedure of copending application Serial No. 79,894, by D. P. Graham)*

A mixture of 75 grams of metal-free phthalocyanine (crude beta modification), 675 grams of dry salt and 10 grams of xylene was charged into a 1.7 gallon steel mill together with 14,500 grams steel balls of 1" diameter, and carbon dioxide was passed in to replace the air. The mill was rotated at 88 R. P. M. for 72 hours. At the end of this time the ground mixture of pigment and salt was separated by screening from the steel balls. The salt-pigment mixture was introduced into 1 liter of water and steamed until free from xylene. After 1 hour extraction at 60° C. with 5 liters of 1.5% sulfuric acid and a subsequent 1 hour extraction with 5 liters of 2% caustic soda at 60° C., the pigment was washed free from salts and caustic, and was dried in a humidity drier.

The product was a soft powder that did not increase substantially in crystal size after storage in xylene at room temperature for 2000 hours.

The strength of the pigment was approximately equal to that of acid-pasted material prepared from the same crude. This tinctorial strength was not altered after 1 hour's treatment in boiling xylene. When incorporated in paints or lacquers, this pigment exhibited much less tendency to crystal growth and flocculation than a pigment prepared by acid-pasting the same crude material.

*Example 2 (Following the procedure of copending application Serial No. 79,902, by Frank W. Lane)*

In a 0.6 gallon mill were placed 4275 grams of 1/8" steel shot, 620 cc. of acetone and 70 grams of beta form crude metal-free phthalocyanine. The mill was rotated at about 70 R. P. M. for 5 days. The charge was then diluted with 500 cc. of water, discharged, and worked up by removal of acetone, acid extraction, and alkali extraction. The dried powder was metal-free phthalocyanine in the beta modification. In lithographic varnish drawdowns, it was equal in strength to and much greener than conventional acid-pasted metal-free phthalocyanine, and was equal in shade and strength to the product of Example 1 hereinabove.

In Example 1 hereinabove, the xylene may be replaced by any other of the organic liquids mentioned in said copending application of D. P. Graham, for instance sym. tetrachlorethane, tetrachloroethylene, tetrahydro-naphthalene, trichloro benzene, acetone, pinene, kerosene and isooctane. Its quantity may be varied from 5 to 50% by weight compared to the weight of the pigment.

In Example 2 on the other hand, it is desirable to have a sufficient quantity of the organic liquid to reduce the entire mix to a fluid, stirrable mass. The acetone in this example may be replaced by alcohol or any other of the organic liquids mentioned in said copending application of Frank W. Lane.

In either example, where acetone or other water-soluble liquid is employed, it is preferable to have the same as nearly as possible free from water.

I claim as my invention:

As a new product, a pigment comprising metal-free phthalocyanine essentially in the form of beta crystals at least 90% of which are of a size not greater than 0.2 micron, said pigment being characterized by a greenish shade of blue compared to the shade of the same phthalocyanine color in acid-pasted form, said pigment being further characterized by substantial absence of tendency to increase its crystal size, with attendant loss of tinctorial strength, when boiled for 1 hour in xylene.

OTTO STALLMANN.

REFERENCES CITED

The following references are of record in the file of this patent:

UNITED STATES PATENTS

| Number | Name | Date |
|---|---|---|
| 2,282,303 | Morrison et al. | May 12, 1942 |
| 2,305,379 | Detrick et al. | Dec. 15, 1942 |
| 2,486,304 | Loukomsky | Oct. 25, 1949 |

FOREIGN PATENTS

| Number | Country | Date |
|---|---|---|
| 569,402 | Great Britain | May 22, 1945 |